(12) United States Patent
Justice (10) Patent No.: US 7,546,200 B2
(45) Date of Patent: Jun. 9, 2009

(54) SYSTEMS AND METHODS FOR DETERMINING AND DISPLAYING VOLUMETRIC EFFICIENCY

(76) Inventor: Roy Dwayne Justice, 1183 Lawson Rd., Bloomington, IN (US) 47404

( * ) Notice: Subject to any disclaimer, the term of this patent is extended or adjusted under 35 U.S.C. 154(b) by 106 days.

(21) Appl. No.: 11/931,940

(22) Filed: Oct. 31, 2007

(65) Prior Publication Data

US 2009/0112451 A1 Apr. 30, 2009

(51) Int. Cl.
*G06F 19/00* (2006.01)
(52) U.S. Cl. ...................................................... 701/115
(58) Field of Classification Search ................. 701/115, 701/102; 123/406.64, 406.12; 73/117.3, 73/118.2
See application file for complete search history.

(56) References Cited

U.S. PATENT DOCUMENTS

| | | | |
|---|---|---|---|
| 3,608,368 A | 9/1971 | Cuff | |
| 4,189,707 A | 2/1980 | Ermert | |
| 5,278,508 A | 1/1994 | Bowman | |
| 5,714,683 A | 2/1998 | Maloney | |
| 5,832,403 A | 11/1998 | Kowatari et al. | |
| 5,913,239 A | 6/1999 | Morris, Jr. et al. | |
| 6,325,047 B2 * | 12/2001 | Kawakami | 123/406.64 |
| 6,328,007 B1 | 12/2001 | Hirasawa et al. | |
| 6,505,505 B1 | 1/2003 | Henzinger et al. | |
| 6,662,640 B2 * | 12/2003 | Yagi | 73/114.34 |
| 6,839,643 B2 | 1/2005 | Kanke et al. | |
| 6,901,790 B2 | 6/2005 | Arai et al. | |
| 6,907,353 B2 | 6/2005 | Sanchez Pina et al. | |
| 7,010,423 B2 | 3/2006 | Piwonka et al. | |
| 7,085,643 B2 | 8/2006 | Muto et al. | |
| 7,139,656 B1 | 11/2006 | Miadenovic | |
| 2002/0107630 A1 | 8/2002 | Yagi | |
| 2003/0159521 A1 | 8/2003 | Sarholz et al. | |
| 2003/0182050 A1 | 9/2003 | Maegawa et al. | |
| 2004/0020471 A1 | 2/2004 | Akagi et al. | |
| 2004/0129249 A1 | 7/2004 | Kondo | |
| 2004/0254747 A1 | 12/2004 | Vollum | |
| 2006/0031030 A1 | 2/2006 | Bennett et al. | |
| 2006/0266273 A1 | 11/2006 | Westberg et al. | |
| 2007/0050155 A1 | 3/2007 | Hocken et al. | |

OTHER PUBLICATIONS

The Webster Range of Hydraulic Test Equipment; Apr. 2005; Webtec Products Ltd.; Model Nos. DHM403 and DHM803; www2.webtec.co.uk.
Auto Enginuity, Unleash the Diagnostics Power Built Into Your Vehicle; http://www.autoenginuity.com/products-speedtracer1.html; 2003-2006; AutoEnginuity, L.L.C.

* cited by examiner

*Primary Examiner*—Hieu T Vo
(74) *Attorney, Agent, or Firm*—Taylor & Aust, P.C.

(57) ABSTRACT

A system for determining and displaying a volumetric efficiency of an engine of an automobile includes an aftermarket display unit configured for installation into the automobile and a controller, the controller including a first memory configured to store calibration data associated with at least some of a plurality of OEM sensors of the engine and displacement data associated with the engine; a plurality of controller inputs coupled to the plurality of OEM sensors; and a controller output coupled to the aftermarket display unit. The controller is configured to execute program instructions to: read the sensor output; determine the volumetric efficiency based on the sensor output, the calibration data and the displacement data; and display the volumetric efficiency using the aftermarket display unit.

25 Claims, 7 Drawing Sheets

SYSTEMS AND METHODS FOR DETERMINING AND DISPLAYING VOLUMETRIC EFFICIENCY

BACKGROUND OF THE INVENTION

1. Field of the Invention

The present invention relates to engines, and, more particularly, to systems and methods for determining and displaying volumetric efficiency of engines.

2. Description of the Related Art

During the previous century, it became common for automobile and racing enthusiasts to modify internal combustion engines in order to improve performance, including both power output and fuel efficiency, of their personal and/or racing automobiles. Oftentimes, the enthusiast replaces original equipment installed (OEI) engine components with aftermarket components intended to provide horsepower and/or efficiency gains. For example, performance gains have traditionally been obtained by employing tuned intake systems, tuned exhaust systems, turbochargers and/or superchargers, carburetion/fuel injection system installations or modifications, ignition timing system modifications, replacement of stock cams with cams having desired valve lift/dwell characteristics, and bore and stroke modifications. With the advent of electronically controlled engines, modifications have also included fuel management changes, e.g., to promote lean burn, ignition timing modifications, and other changes effected by the vehicle/engine electronic control unit (ECU).

Although substantial effort and resources may be required to perform such engine modifications, with prior art technology it has been somewhat difficult and expensive to quantify the performance gains obtained via the modifications. For example, dynamometer testing may be performed to measure horsepower gains. However, dynamometer testing is often beyond the financial reach of many enthusiasts. In addition, dynamometer testing has costs above and beyond the direct costs associated with accessing/operating the dynamometer equipment, such as unnecessary wear and tear on the engine/vehicle and the financial and environmental costs associated with running the engine/vehicle at the sometimes extreme conditions required to verify performance.

What is needed in the art is an improved method and system for measuring engine performance gains.

SUMMARY OF THE INVENTION

The present invention provides an improved method and system for measuring engine performance gains via systems and methods for determining and displaying volumetric efficiency.

The invention, in one form thereof, is directed to a system for determining and displaying a volumetric efficiency of an engine of an automobile. The engine includes a plurality of original equipment manufacturer (OEM) sensors and an electronic control unit (ECU) coupled to the plurality of OEM sensors for operating the engine based on reading a sensor output from each of the plurality of OEM sensors. The system includes an aftermarket display unit configured for installation into the automobile and a controller. The controller includes a first memory configured to store calibration data associated with at least some of the plurality of OEM sensors and displacement data associated with the engine; a plurality of controller inputs coupled to the plurality of OEM sensors; and a controller output coupled to the aftermarket display unit. The controller is configured to execute program instructions to: read the sensor output; determine the volumetric efficiency based on the sensor output, the calibration data and the displacement data; and display the volumetric efficiency using the aftermarket display unit.

The invention, in another form thereof, is directed to a system for determining and displaying a volumetric efficiency of a positive displacement device. A plurality of sensors are coupled to the positive displacement device, each sensor of the plurality of sensors being configured to provide a sensor output relating to an operating condition of the positive displacement device. The system includes a display unit and a controller. The controller includes a first memory configured to store calibration data associated with at least some of the plurality of sensors and displacement data associated with the positive displacement device; a plurality of controller inputs coupled directly to the plurality of sensors; and a controller output coupled to the display unit. The controller is configured to execute program instructions to read the sensor output; determine the volumetric efficiency based on the sensor output, the calibration data and the displacement data; and display the volumetric efficiency using the display unit.

The invention, in yet another form thereof, is directed to a method for determining and displaying a volumetric efficiency of an internal combustion engine, wherein a plurality of sensors are coupled to the internal combustion engine, each sensor of the plurality of sensors being configured to provide a sensor output relating to an operating condition of the internal combustion engine. The method includes coupling the plurality of sensors to a controller; coupling a display unit to the controller; and executing program instructions with the controller to: obtain the sensor output from the plurality of sensors; obtain calibration data associated with at least some of the plurality of sensors; obtain displacement data associated with the internal combustion engine; determine the volumetric efficiency based on the sensor output, the calibration data and the displacement data; and display the volumetric efficiency to a user of the internal combustion engine with the display unit.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate a preferred embodiment of the invention, in one form, and such exemplifications are not to be construed as limiting the scope of the invention in any manner.

DETAILED DESCRIPTION OF THE INVENTION

Figure 1:
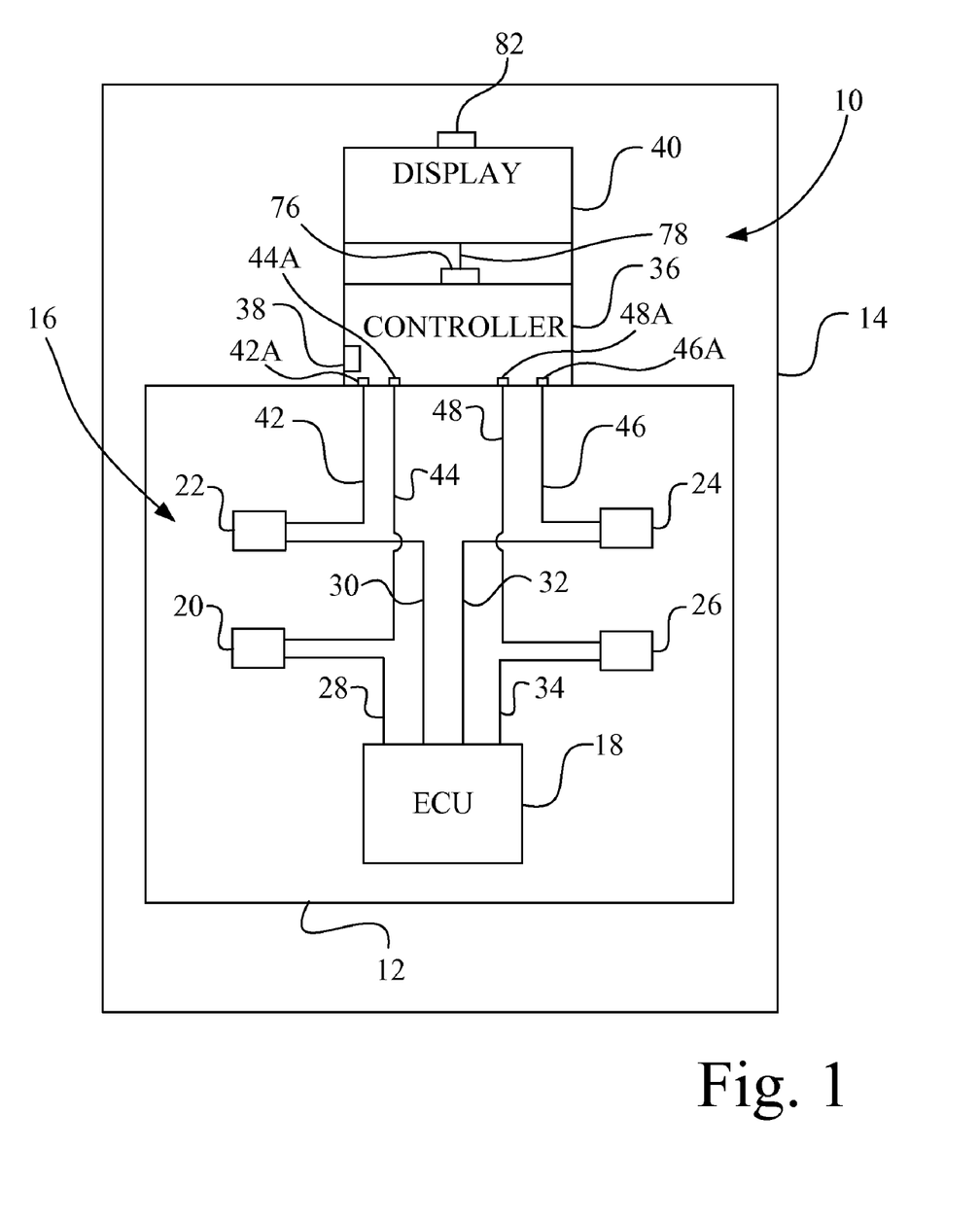
FIG. 1 schematically depicts a system for determining and displaying a volumetric efficiency of a positive displacement device in the form of an engine of an automobile in accordance with an embodiment of the present invention.

Referring now to the drawings, and particularly to FIG. 1, there is shown a system 10 for determining and displaying a volumetric efficiency of a positive displacement device in the form of an engine 12 of an automobile 14. In the present embodiment, automobile 14 is a conventional mass-produced passenger automobile. However, it is alternatively contemplated that in other embodiments, automobile 14 may be another vehicle type, such as a racing machine, or a truck, e.g., a light truck or an over-the-road truck. In addition, although the present invention is described with respect to an automobile engine, it will be understood that the present invention is equally applicable to other types of positive displacement devices, such as positive displacement pumps and positive displacement compressors.

System 10 may be used for in-situ measurement and monitoring of engine 12 performance in automobile 14. For example, many automotive enthusiasts buy performance enhancing equipment for their street and race cars. The most significant improvements in engine performance are typically gained by increasing air flow through the engine, which is the basis for the success of aftermarket high performance components such as carburetors, intake manifolds, exhaust headers, mufflers, superchargers, cylinder heads, air cleaners, and camshafts. These components may be expensive to procure and labor intensive to install. Yet, after installation, the consumer may have few choices when it comes to measuring the performance gains. Even when air flow has been improved, realizing horsepower gains may require a change in ignition and fuel delivery parameters.

Accordingly, system 10 may provide a direct measurement of the air flow improvements resulting from engine modifications. By indicating volumetric efficiency, system 10 may provide the consumer the information necessary to optimize engine performance based on known volumetric efficiency enhancements.

In the present embodiment, system 10 includes a display configured in the form of an automotive-type instrument, e.g., similar in appearance to an aftermarket oil pressure gauge or tachometer. The display may be mounted within easy view of the driver and give continuous indication of volumetric efficiency, expressed as a percentage. For electronic fuel injected vehicles equipped with the requisite sensors, discussed herein, installation may require only connection to power, ground, and the sensors. However, in other embodiments, the required sensors may be installed on any engine, carbureted or fuel injected. In addition, with the addition of a shaft speed sensor, system 10 may be employed in conjunction with other positive displacement devices, such as a positive displacement pump or compressor, wherein a plurality of sensors are coupled to the positive displacement device.

In the present embodiment, system 10 is in the form of an aftermarket device configured for installation into automobile 14 and for interfacing with components of engine 12 as set forth below. In other embodiments, it is contemplated that system 10 may alternatively be considered a part of automobile 14 and/or engine 12, for example, sold by the manufacturer of automobile 14 and/or engine 12 as part of an OEI package.

Engine 12 includes a plurality of sensors 16, such as original equipment manufacturer (OEM) sensors, and an electronic control unit (ECU) 18 coupled to plurality of sensors 16 for operating engine 12 based on reading the sensor output from each sensor. Each sensor of plurality of sensors 16 is configured to provide sensor output relating to an operating condition of engine 12. Although sensors 16 and ECU 18 are considered in the present embodiment as being part of engine 12, it will be understood that in other embodiments, sensors 16 and ECU 18 may be alternatively considered to be part of automobile 14, or may be separate units, e.g., aftermarket units, added to engine 12 and/or automobile 14, for example, by an owner or operator of engine 12 and/or automobile 14. In yet other embodiments of the present invention, sensors 16 may be considered as part of system 10.

In any case, sensors 16 of the present embodiment include a mass airflow (MAF) sensor 20, an air temperature sensor 22, a barometric pressure sensor 24 and an engine revolution indicator 26. MAF sensor 20 is communicatively coupled to ECU 18 via a communications link 28, air temperature sensor 22 is communicatively coupled to ECU 18 via a communications link 30, barometric pressure sensor 24 is communicatively coupled to ECU 18 via a communications link 32, and engine revolution indicator 26 is communicatively coupled to ECU 18 via a communications link 34. Each of communications links 28, 30, 32 and 34 are capable of transmitting the output of the respective sensor to ECU 18, including both analog and digital output.

MAF sensor 20 is configured to sense the mass flow of air into the intake (not shown) of engine 12, and to output a signal proportional to the mass flow. MAF sensor 20 is a hot wire anemometer in the present embodiment, although other flow sensors such as those conventionally used to measure air flow into the engine of an automobile may alternatively be used.

Air temperature sensor 22 is configured to sense the temperature of the air supplied to the intake of engine 12, and to provide an output signal that is proportional to that temperature. For a normally aspirated engine 12, air temperature sensor 22 measures ambient atmospheric temperature. For an engine 12 having a charged air intake, air temperature sensor 22 may be positioned to sense the output temperature of the charging device immediately upstream of the engine 12 intake, e.g., turbocharger, supercharger or ram air system exit, where the user wants to separate the effects of the charging device out of the volumetric efficiency determination. In cases where the user desires a determination of the volumetric efficiency of the combination of the engine and charging device, air temperature sensor 22 may be positioned to sense ambient temperature, e.g., at the inlet of the charging device. Alternatively, it is contemplated that the user may install an air temperature sensor 22 at both the inlet and exit of the charging device to allow a determination of volumetric efficiency based on the engine alone or the combination of engine and charging device.

Barometric pressure sensor 24 is configured to sense the ambient pressure of the air supplied to the intake of engine 12, and to provide an output signal that is proportional to that pressure. For a normally aspirated engine 12, barometric pressure sensor 24 measures ambient atmospheric pressure, whereas for an engine 12 having a charged air intake, a barometric pressure sensor 24 may be positioned at the inlet and/or exit of the charging device, as set forth above with respect to air temperature sensor 22, depending on whether the user desires a volumetric efficiency determination for the engine alone, a combination of the engine and charging device, or both.

Engine revolution indicator 26, also referred to as a device revolution indicator, is a crank position sensor in the present embodiment, which outputs a signal that is proportional to the rotational velocity of the crankshaft (not shown) of engine 12.

Alternatively, it is contemplated that in other embodiments, engine revolution indicator 26 may be another device that provides an output relating to engine timing information, such as one or more ignition coils, or another tachometer signal source.

System 10 includes a controller 36 (microcontroller) having a nonvolatile (NV) memory 38, and a display unit 40 coupled to controller 36. Display unit 40 of the present embodiment is an aftermarket display configured for installation into an existing automobile 14.

In addition to being communicatively coupled to ECU 18, plurality of sensors 16 are also directly communicatively coupled to system 10, i.e., in parallel to ECU 18. MAF sensor 20 is communicatively coupled to controller 36 via a communications link 44, air temperature sensor 22 is communicatively coupled to controller 36 via a communications link 42, barometric pressure sensor 24 is communicatively coupled to controller 36 via a communications link 46, and engine revolution indicator 26 is communicatively coupled to controller 36 via a communications link 48. Controller 36 includes a plurality of controller inputs 42A, 44A, 46A and 48A coupled directly to plurality of sensors 16 via the respective communications links 42, 44, 46 and 48. Each of communications links 42, 44, 46 and 48 are capable of transmitting the output of the respective sensor to controller 36, including both analog and digital output, as respectively required. By virtue of being coupled directly to plurality of sensors 16, controller 36 obtains the data without any delays associated with obtaining sensor data from ECU 18.

As described herein, controller 36 reads the sensor output from MAF sensor 20, air temperature sensor 22, barometric pressure sensor 24, and determines the rotational speed of engine 12 using engine revolution indicator 26. NV memory 38 is configured to store engine 12 displacement data, sensor calibration data for plurality of sensors 16, including lookup tables, and physical constants. Controller 36 includes executable program instructions in the form of firmware that employs the sensor output and the data in NV memory 38 to calculate the mass of air entering the engine per revolution and the density of the ambient air (using the ideal gas law) and subsequently the engine's volumetric efficiency. Controller 36 then produces a voltage signal, corresponding to the volumetric efficiency, which is conditioned and displayed on display unit 40, e.g., in the form of an analog or digital meter. Because the sampling and calculation speed of controller 36 is much faster than the mechanical processes of a typical reciprocating engine, and because system 10 directly reads the output of sensors 16, rather than reading data pertaining to sensors 16 from ECU 18, the volumetric efficiency is effectively displayed in real time. Although the executable program instructions are in the form of firmware in the present embodiment, it will be understood that software and/or hardware, e.g., state machines, may be employed in addition to or in place of firmware in other embodiments.

System 10 is thus configured to determine and display the overall volumetric efficiency of a positive displacement device, e.g., an internal combustion engine, such as engine 12, or a positive displacement pump or compressor, in real time during operation of the engine. Hereinafter, volumetric efficiency is described with reference to engine 12. As used herein, volumetric efficiency is a measure that may be used to quantitatively describe the air capacity of engine 12, and is thus defined as the mass of air that passes into engine 12 in one revolution of engine 12 divided by the mass of air that would theoretically fill the displacement volume of one revolution of engine 12 at engine 12 intake air density. This ratio may be expressed as a percentage, and is essentially a measure of how well air density is preserved as air moves from the atmosphere to the combustion chamber of engine 12.

Figure 2:
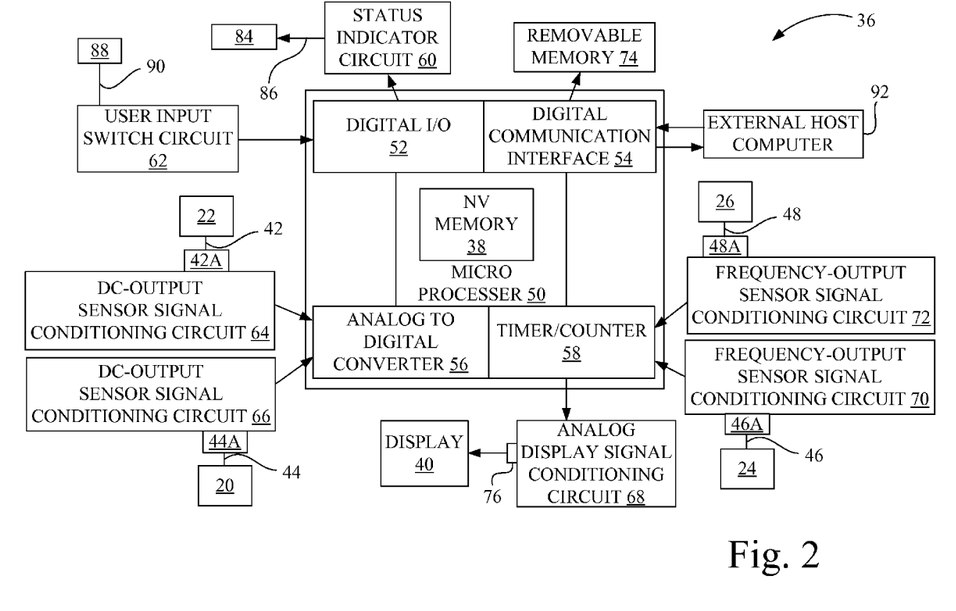
FIG. 2 schematically depicts a controller configured to determine volumetric efficiency in accordance with the embodiment of FIG. 1.

Referring now to FIG. 2, controller 36 also includes a microprocessor 50; and a digital input/output (I/O) 52, digital communication interface 54, analog to digital (A/D) converter 56 and timer/counter (T/C) circuit 58, each of which are communicatively coupled to microprocessor 50.

In addition, controller 36 includes a status indicator circuit 60 and a user input switch circuit 62 coupled to digital I/O 52; DC-output sensor signal conditioning circuits 64 and 66 coupled to A/D converter 56; an analog display signal conditioning circuit 68 and frequency-output sensor signal conditioning circuits 70 and 72 coupled to T/C circuit 58; and a removable memory 74 coupled to digital communication interface 54.

Controller 36, and in particular, microprocessor 50, is configured to execute the program instructions to read the sensor output of each of plurality of sensors 16, determine the volumetric efficiency of engine 12 based on the sensor output, and the calibration data and displacement data stored in NV memory 38, and display the volumetric efficiency using display unit 40. In the present embodiment, controller 36 includes an output 76 that is coupled to display unit 40 via a communications link 78 that transmits a signal representing volumetric efficiency to display unit 40. Controller is configured to execute the program instructions to determine the volumetric efficiency in real time during each revolution of engine 12, based on the output of engine revolution indicator 26, and in the present embodiment, determines the volumetric efficiency in real time a plurality of times during each revolution of engine 12. The display needle of display unit 40 in the present embodiment has a response time that effectively averages the determined volumetric efficiency readings. However, in other embodiments of the present invention, such as where a digital or fast analog display is used, it is contemplated that the volumetric efficiency is averaged by controller 36, and then displayed on display unit 40.

Figure 3:
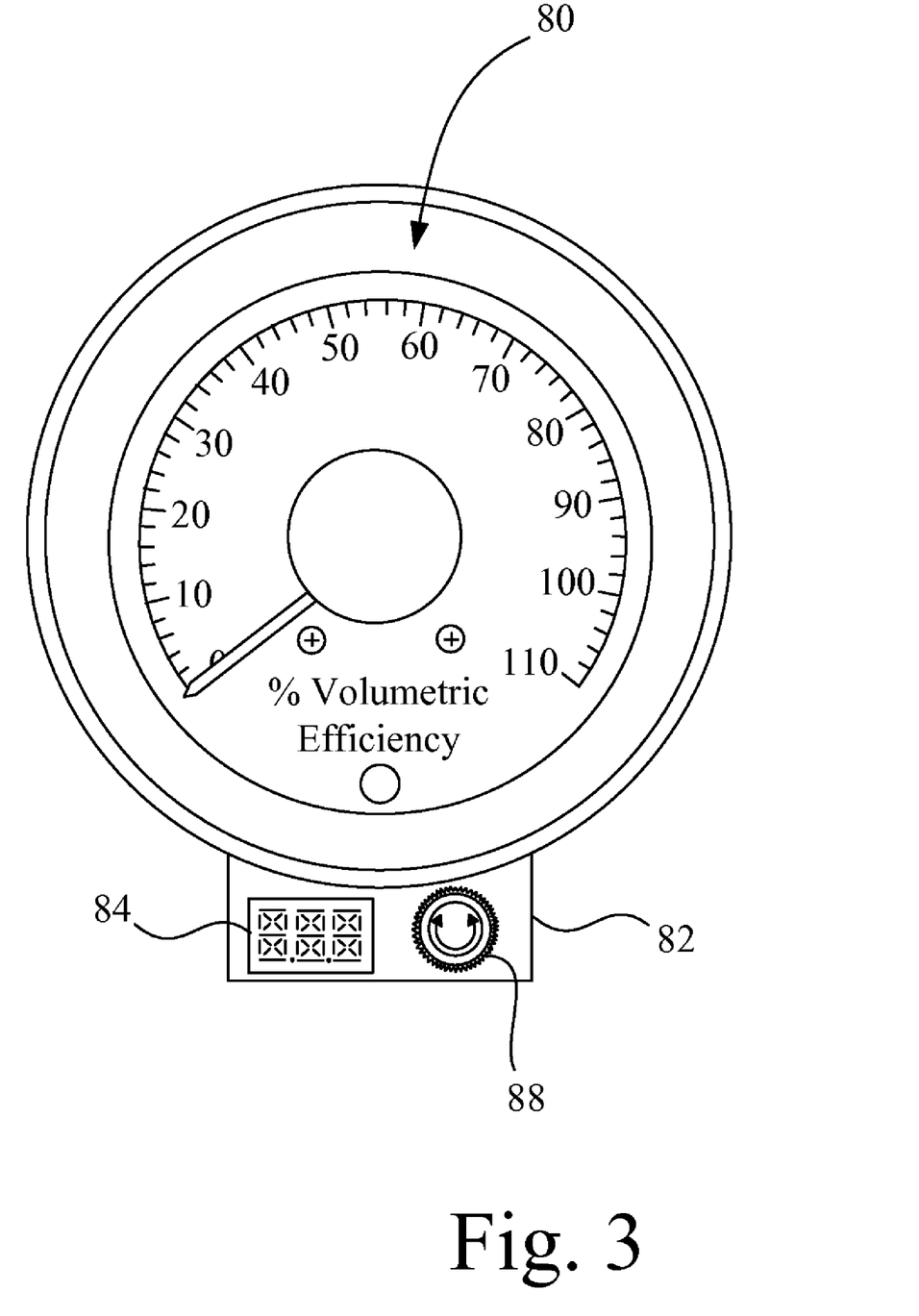
FIG. 3 depicts a display unit for displaying volumetric efficiency in accordance with the embodiment of FIG. 1.

Referring now to FIG. 3 in conjunction with FIG. 2, display unit 40 includes a main display 80, a user interface 82 having a status display 84 coupled to status indicator circuit 60 via a communications link 86, and a user input switch 88 coupled to user input switch circuit 62 via a communications link 90. In the present embodiment, status display 84 is an alphanumeric LED display, and user input switch 88 is a rotary switch having multiple detent positions for providing multiple signal levels to user input switch circuit 62.

During operation, controller 36 receives sensor output from sensors 22, 20, 24 and 26 at signal conditioning circuits 64, 66, 70 and 72 via communication links 42, 44, 46 and 48, and controller inputs 42A, 44A, 46A and 48A, respectively, and processes the sensor output as generally described below.

In the present embodiment, MAF sensor 20 produces as output a 0-5 Vdc analog signal corresponding to the mass flow rate of air into the intake manifold of engine 12. This signal is received at DC-output sensor signal conditioning circuit 66, which includes a current-limiting resistor (not shown) to limit current from MAF sensor 20 in the event of a failure and subsequent short circuit of microprocessor 50. DC-output sensor signal conditioning circuit 66 provides the conditioned signal to A/D converter 56, which converts the signal into digital form for processing by microprocessor 50. The relationship between MAF sensor 20 voltage and mass flow rate is nonlinear. Thus a lookup table (not shown) that correlates voltage with mass flow rate is stored NV memory 38. Microprocessor 50 converts the conditioned voltage signal received from A/D converter 56 to a measured flow rate value by reference to the lookup table.

Air temperature sensor 22 of the present embodiment produces a 0-5 Vdc analog output proportional to the temperature of the engine intake air. The measurement of ambient air temperature based on the sensor output of air temperature sensor 22 is thus similar to the processing of MAF sensor 20 output. This sensor output signal is received at DC-output sensor signal conditioning circuit 64, which includes a current-limiting resistor (not shown) to limit current from air temperature sensor 22 in the event of a failure and subsequent short circuit of microprocessor 50. DC-output sensor signal conditioning circuit 64 provides the conditioned signal to A/D converter 56, which converts the signal into digital form for processing by microprocessor 50. In the present embodiment, the relationship between air temperature sensor 22 voltage and temperature is nonlinear, and thus, as with the processing of the sensor output of MAF sensor 20, a lookup table that correlates voltage with temperature is employed by microprocessor 50 in processing the output of air temperature sensor 22 to yield a measured temperature. For embodiments where the relationship between temperature and sensor voltage is linear, microprocessor 50 may directly convert the measured voltage to temperature without the use of a lookup table.

In the present embodiment, barometric pressure sensor 24 provides sensor output in the form of 5 Volt pulses at a frequency that is proportional to pressure. Microprocessor 50 measures barometric pressure by counting the number of clock cycles of T/C circuit 58 between leading edges of successive voltage pulses. The sensor output of barometric pressure sensor 24 is supplied to frequency-output sensor signal conditioning circuit 70, which includes a limiting circuit (not shown) to limit transients, including a resistive divider to limit voltage to 5 Vdc peak for input to microprocessor 50. In embodiments where the barometric pressure sensor 24 has a peak output of 5 Volts, voltage divider circuitry is not required. In embodiments where the output of barometric pressure sensor 24 is nonlinear with respect to pressure, a lookup table may be stored in NV memory 38, and may be accessed by microprocessor 50 in order to linearize the output of barometric pressure sensor 24.

Engine revolution indicator 26 of the present embodiment provides a sensor output in the form of voltage pulses that correspond in frequency to the rotational velocity of engine 12. In the present embodiment, engine revolution indicator is a crank position sensor, although in other embodiments, the signal(s) supplied to the primary side of the ignition coil(s) may be employed. Microprocessor 50 measures engine 12 speed by counting the number of clock cycles of T/C circuit 58 between rising edges of successive voltage pulses. In the present embodiment, the sensor output of engine revolution indicator 26 is supplied to frequency-output sensor signal conditioning circuit 72, which includes a limiting circuit (not shown) to limit transients, including a resistive divider to limit voltage to 5 Vdc peak for input to microprocessor 50. In other embodiments, additional signal conditioning may be provided via a Schmitt trigger.

Controller 36 and display unit 40 are configured to display a plurality of parameters using display unit 40 with user interface 82, which is configured to receive user input to selectively direct controller 36 to display one or more of the parameters using status display 84 of display unit 40. In the present embodiment, the parameters that may be displayed include not only volumetric efficiency, but also the processed sensor output from each sensor of plurality of sensors 16, so as to display the selected parameter, i.e., air mass flow, barometric pressure, air temperature, and engine 12 speed. User input switch circuit 62 receives signals from user input switch 88 indicative of the parameter to be displayed, and forwards the input in digital form to digital I/O 52 for processing by microprocessor 50 of controller 36.

The user may effect the displaying of parameters by turning user input switch 88 from one detent position to the next, thereby providing input to user input switch circuit 62 via communications link 90, which directs controller 36 to display the selected parameter on main display 80 of display unit 40 via analog display signal conditioning circuit 68. In addition, based on the user input, microprocessor 50 provides to digital I/O 52 signals indicative of the parameter being displayed on main display 80, which are received from digital I/O 52 by status indicator circuit 60. Status indicator circuit 60 then provides the digitally processed signals to status display 84 via communications link 86, which indicates which parameter is being displayed on main display 80, e.g., with an alphanumeric indication. Although main display 80 is depicted as indicating a scale for "% Volumetric Efficiency," it will be understood that additional scales may be employed with regard to other parameters, which for purposes of clarity are not illustrated in FIG. 1. In addition, although one "needle" is illustrated on the dial of main display 80, it will be understood that additional "needles" may be employed to allow simultaneous display of more than one parameter.

Controller 36 is configured to execute program instructions for selective operation in at least one of a plurality of different operating modes. In the present embodiment, controller 36 is configured to operate in one or more of three modes simultaneously: a data logging mode configured to log data pertaining to sensor output for plurality of sensors 16; a host computer interface mode configured for communications with a host computer 92 that is associated with an end user of system 10; and a normal operating mode, in which one or more of the aforementioned parameters are displayed, e.g., volumetric efficiency. User interface 82 is configured to receive a user input to select an operating mode. In the present embodiment, the operating mode is selected via user interface 82 by the user actuating user input switch 88, and the selected mode is indicated via an alphanumeric indication on status display 84. For example, by turning user input switch 88, different operating modes may be sequentially indicated on status display 84, and by leaving user input switch in a given position, the indicated operating mode is thus selected. In order to accommodate the selection of both parameters to display and operating mode, user input switch 88 and user input switch circuit 62 in the present embodiment are configured such that continued rotation of user input switch 88 will cycle through the data logging mode, the host computer interface mode, and the normal operating mode, which is indicated by virtue of status display 84 indicating a parameter that is displayed.

Alternatively, it is considered that in other embodiments, user input switch 88 may be in the form of a combination rotary and push button switch, wherein a mode may be selected by rotating user input switch 88 until status display 84 indicates the desired operating mode, pressing user input switch to select the mode, which is then indicated as being turned on or off via an alphanumeric indication on status display 84. The user may then rotate and press user input switch 88 to select another operating mode for simultaneous operation with the first selected operating mode, and may continue the selection process to also select a parameter to display. Such an embodiment would allow the user to display volumetric efficiency and/or one of the other parameters, and also log data and/or interface/communicate with a host computer at the same time.

In yet other embodiments, it is contemplated that user input switch 88 may take the form of a plurality of individual switches that may be manipulated by the user to both select one or more operating modes and one or more parameters to display. In yet still other embodiments, user input switch 88 may take the form of a single pushbutton that may be pushed repeatedly to cycle through the parameters. In such embodiments, the normal operating mode may be maintained as a default operating mode, the host computer interface and data logging modes may be automatically selected based on controller 36 automatically detecting a connection to host computer 92 and/or removable memory 74, and data logging may be manually started and stopped via a separate switch, e.g., a separate push button switch.

In any case, status display 84 is configured to indicate at least one of an operating mode that controller 36 is currently operating in, and to indicate which parameter(s) is currently being displayed on main display 80. In addition, controller 36 and display unit 40, e.g., main display 80, are configured to selectively display, e.g., based on user selection via user input switch 88, at least one parameter from the plurality of parameters using main display 80 of display unit 40. As set forth above, the plurality of parameters include volumetric efficiency and the sensor output for at least one of plurality of sensors 16.

Digital communication interface 54 is configured for bidirectional communication with each of host computer 92 and removable memory 74. For example, digital communication interface 54 is configured to interconnect controller 36 with host computer 92, and to interface between microprocessor 50 and host computer 92. In addition digital communication interface 54 is configured to interface with removable memory 74 to allow microprocessor 50 to store sensor output data and/or volumetric efficiency data in removable memory 74 during operation in the data logging mode, e.g., for later analysis.

Controller 36 is configured to receive updates to the program instructions from host computer 92, and to receive changes to the calibration data and the displacement data from host computer 92 while operating in the host computer interface mode.

Figure 4A:
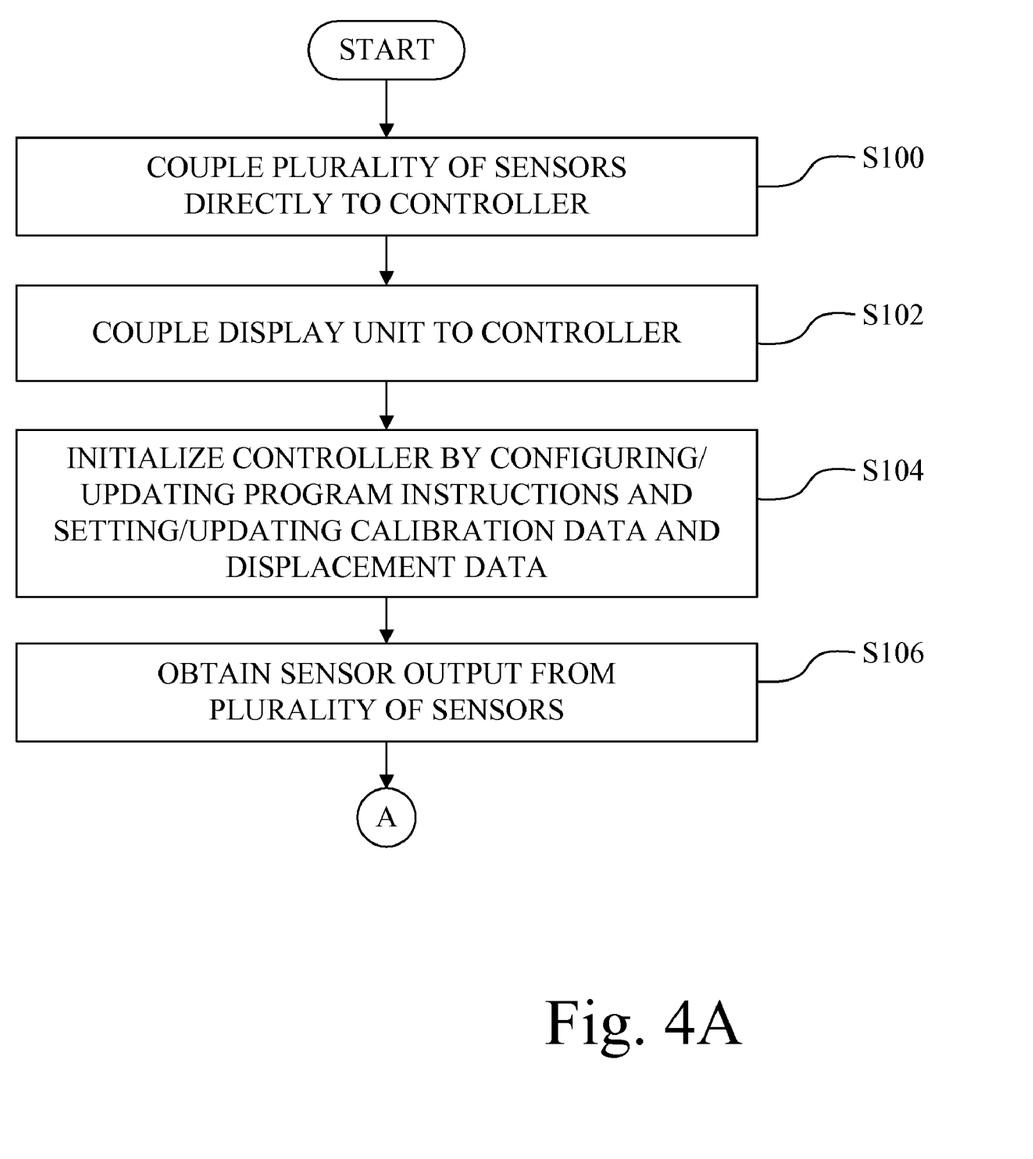
FIGS. 4A and 4B are a flowchart that generally depicts a method for determining and displaying the volumetric efficiency of an internal combustion engine in accordance with an embodiment of the present invention.
Figure 4B:
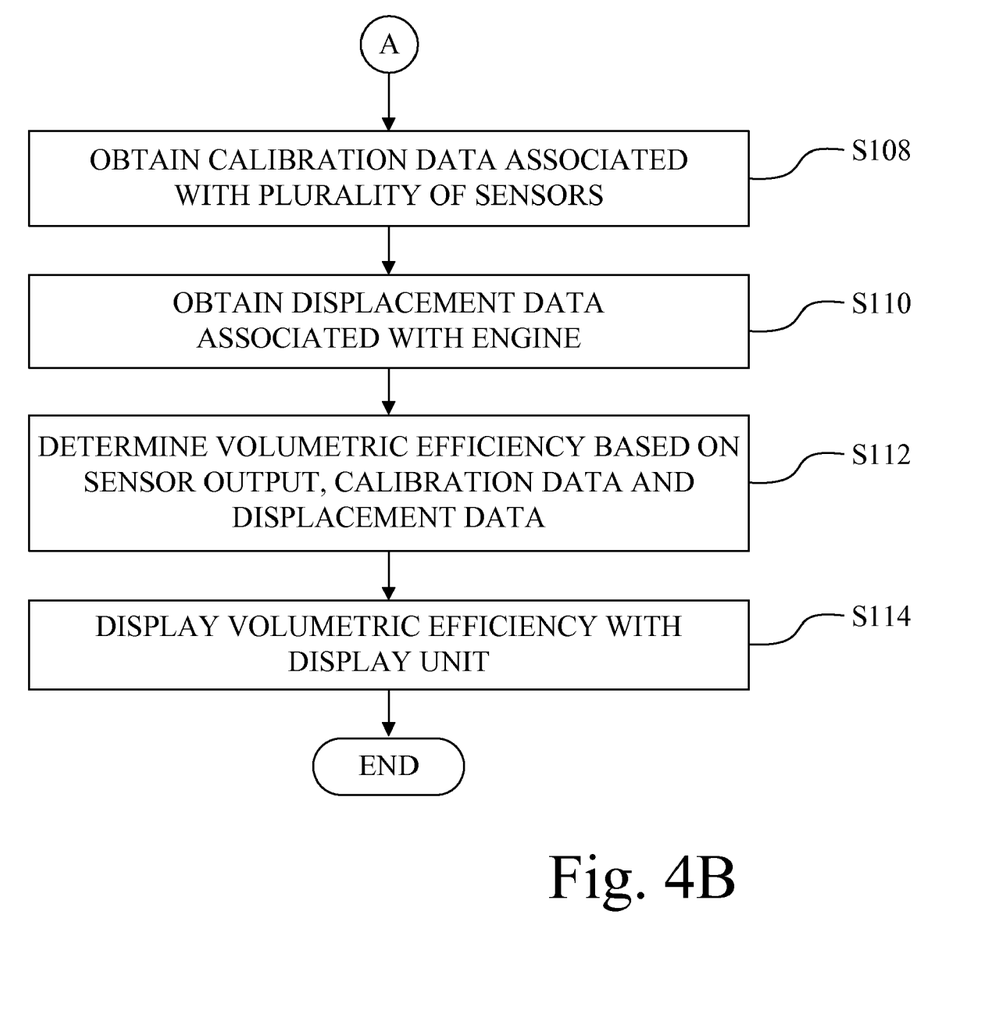

Referring now to FIGS. 4A and 4B, and steps S100-S114, an embodiment of a method in accordance with the present invention for determining and displaying a volumetric efficiency of an internal combustion engine is generally described. As set forth above, plurality of sensors 16 are coupled to the internal combustion engine, e.g., engine 12, and each sensor of plurality of sensors 16 is configured to provide a sensor output relating to an operating condition of the internal combustion engine. Although a particular sequence of operations is described below, such description is made for purposes of convenience, it will be understood that the present invention is not limited to any such particular sequence.

At step S100, plurality of sensors 16 is coupled to controller 36. For example, the end user of system 10 couples controller 36 directly to plurality of sensors 16, so that controller 36 obtains sensor output by receiving the sensor output directly from plurality of sensors 16, as opposed to obtaining sensor data via ECU 18. Because system 10 is a separate system relative to automobile 14 and ECU 18, etc., system 10 may be retrofitted to existing automobiles, etc. Also, by being a separate system, system 10 does not increase the complexity or cost of automobile system ECUs, which are themselves the result of extensive development by the manufacturer. Hence, volumetric efficiency may be determined and displayed to an operator of automobile 14 without the development time and cost associated with modifying ECUs currently used in automobiles.

At step S102, display unit 40 is coupled to controller 36. In the present embodiment, controller 36 is housed separately from display unit 40, and may be coupled to controller 36 by the end user of system 10. In other embodiments, controller 36 may be mounted in the same housing as display unit 40, and may be coupled to display unit 40 during the manufacturing of system 10.

At step S104, controller 36 is initialized. In the present embodiment, the initialization of controller 36 is initially performed by the user by connecting host computer 92 with controller 36 and placing controller 36 into the host computer interface mode. As manufactured, system 10 includes program instructions that are used in performing the above-described operations of controller 36. However, the calibration data and displacement data for the particular engine 12 and sensors 16 are manually set via host computer 92 in the present embodiment. In other embodiments, it is contemplated that the calibration data and displacement data for the particular engine 12 and sensors 16 may be preprogrammed into controller 36, e.g., NV memory 38, based on the manufacturer and/or model of automobile 14. In addition, any updates to the program instructions may be downloaded to system 10 from host computer 92. Thus, when initially purchased, the initialization of controller 36 may include configuring, including updating, the program instructions with host computer 92, and includes setting the calibration data and the displacement data, by reading the information into NV memory 38. Microprocessor 50 then reads the program instructions from NV memory 38, and initializes port settings (input ports, i.e., controller inputs 42A, 44A, 46A and 48A) and peripherals (digital I/O 52, digital communication interface 54, A/D converter 56 and T/C circuit 58) in order to complete the initialization, at which point system 10 is ready for operation.

At step S106, controller 36 executes program instructions to obtain the sensor output from plurality of sensors 16. Beginning at step S106, it is assumed for purposes of illustration that engine 12 is operating, and that sensor output is being generated from plurality of sensors 16.

At step S108, controller 36 executes program instructions to obtain the calibration data for plurality of sensor 16 from NV memory 38.

At step S110, controller 36 executes program instructions to obtain displacement data associated with engine 12.

At step S112, controller 36 executes program instructions to determine volumetric efficiency based on the sensor output, e.g., from each of MAF sensor 20, air temperature sensor 22, barometric pressure sensor 24 and engine revolution indicator 26; and the calibration data and displacement data.

In the present embodiment, the determination of volumetric efficiency includes controller 36 calculating a measured intake air mass flow rate based on sensor output from MAF sensor 20 and based on the calibration data associated with MAF sensor 20 that is stored in the form of a lookup table in NV memory 38. In addition, controller 36 determines a theoretical intake air mass flow rate based on the sensor output from air temperature sensor 22, barometric pressure sensor 24 and engine revolution indicator 26; the calibration data associated with air temperature sensor 22 and barometric pressure sensor 24; and the displacement data. Controller 36 then determines the volumetric efficiency based on calculating a ratio of the measured intake air mass flow rate and the theoretical intake air mass flow rate.

In the present embodiment, volumetric efficiency is determined in real time, since the rate at which data is obtained from plurality of sensors 16 and the speed at which the calculations are performed by controller 36 exceeds the speed of engine 12, such that the volumetric efficiency is determined more than once for each revolution of engine 12.

At step S114, controller 36 executes program instructions to display the volumetric efficiency to a user of engine 12 with said display unit 40.

An embodiment of the determinations of step S112 is described in greater detail as follows.

As set forth above, volumetric efficiency, $\epsilon$, is determined as being the ratio of the measured mass, $M_{meas}(\alpha)$, of air entering engine 12 during an angle of rotation to the mass of air, $M_{disp}(\alpha)$, that would occupy the fraction of the displacement volume pumped during the same angle of rotation under the current ambient conditions of atmospheric pressure and temperature. In the special case where $\alpha$ is equal to one revolution of engine 12, the volumetric efficiency is the ratio of measured mass to the theoretical mass pumped in one rotation, which for a four-cycle engine is half the total displacement. In any case, volumetric efficiency may be given as:

$$\varepsilon \equiv \frac{M_{meas}(\alpha)}{M_{disp}(\alpha)} \quad \text{(Equation 1)}$$

To implement Equation 1 in controller 36, it is advantageous to adapt the equation to minimize the calculation steps and maximize the frequency at which the calculation can be repeated. In the present embodiment, where the MAF sensor 20 produces a voltage that is a function of mass flow rate, the numerator and denominator of equation 1 are converted to the time domain as follows:

$$M_{meas}(\alpha) = \frac{\dot{M}_{meas}}{\omega} \quad \text{(Equation 2)}$$

$$M_{disp}(\alpha) = \frac{\dot{M}_{disp}}{\omega} \quad \text{(Equation 3)}$$

where $\omega$ is the angular velocity of engine 12.

Using Equations 2 and 3, in conjunction with Equation 1, volumetric efficiency may thus be expressed as a ratio of mass flow rates:

$$\varepsilon = \frac{\dot{M}_{meas}}{\dot{M}_{disp}} \quad \text{(Equation 4)}$$

Controller 36 determines the measured mass flow rate, $\dot{M}_{meas}$, by measuring the voltage signal (sensor output) from MAF sensor 20 using the A/D converter 56, using the resulting x-bit value to look up the mass flow stored in the look-up table residing in NV memory 38, and multiplying by a scale factor.

The relationship between output voltage from MAF sensor 20 and mass flow in the present embodiment is non-linear. Therefore, a lookup table is used to eliminate the need to perform complex calculations to convert measured voltage to mass flow. Before being stored in NV memory 38, the lookup table is divided by a scale factor so that it will fill an x-bit memory space in NV memory 38 to match the x-bit resolution of the A/D converter 56 measurement. The number of bits (x) chosen for the lookup table resolution may vary depending on A/D converter and available memory. In the present embodiment, the number of bits is 8.

Controller 36 determines the theoretical mass flow rate, $\dot{M}_{disp}$, by calculating the rate, $\dot{V}$, at which volume is being pumped by engine 12, using the engine 12 displacement data stored in NV memory 38 and the engine speed as measured by controller 36 via the sensor output of engine revolution indicator 26:

$$\dot{V} = \frac{v\omega}{2}, \text{ where } v \text{ is engine displacement} \quad \text{(Equation 5)}$$

The ideal gas law and the measured temperature and pressure are then used to convert $\dot{V}$ to a theoretical mass flow rate:

$$P\dot{V} = \dot{N}RT, \quad \text{(Equation 6)}$$

where N is the number of moles of gas in volume V, P is the ambient pressure, T is the ambient temperature, and R is a gas constant.

Given that the average atomic mass of air is approximately 29 grams per mole:

$$N = \frac{M_{disp}}{29}, \quad \text{(Equation 7)}$$

and hence:

$$\dot{N} = \frac{\dot{M}_{disp}}{29} \quad \text{(Equation 8)}$$

Substituting Equation 8 into Equation 6, and solving for $\dot{M}$ gives:

$$\dot{M}_{disp} = \frac{29P\dot{V}}{RT} \quad \text{(Equation 9)}$$

Substituting Equation 5 for $\dot{V}$ gives:

$$\dot{M}_{disp} = \frac{29Pv\omega}{2RT} \quad \text{(Equation 10)}$$

In order to evaluate Equation 10, controller 36 measures the temperature, pressure and engine speed based on the sensor output of air temperature sensor 22, barometric pressure sensor 24 and engine revolution indicator 26, respectively. Air temperature is acquired from the analog signal of air temperature sensor 22, which is passed to A/D converter 56. The sensor's voltage is a non-linear function of the temperature, and hence, a lookup table (calibration data) is used to eliminate the need to perform complex calculations to convert measured voltage to temperature. The result from A/D converter 56 is used to address the look up table stored in NV memory 38, which is then multiplied by a scale factor to yield the measured temperature. Before being stored in NV memory 38, the lookup table is divided by a scale factor so that it will fill an x-bit memory space in NV memory 38 to match the x-bit resolution of the A/D converter 56 measurement. The number of bits (x) chosen for the lookup table resolution may vary depending on A/D converter and available memory. In the present embodiment, the number of bits is 8.

The sensor output of barometric pressure sensor 24 is a series of fixed-width pulses, wherein the frequency of the pulses is a linear function of pressure. The slope and offset of this function is stored in NV memory 38 as calibration data. The controller 36 measures the frequency of the pulses as the reciprocal of the time (T/C circuit 58 clock cycles/clock freq) between leading edges of successive pulses. In other embodiments, trailing edges may be used. The measured frequency is then multiplied by the slope value, and the offset is then added to yield the measured pressure.

Based on Equations 4 and 10, for the calculation of volumetric efficiency may be given as:

$$\varepsilon = \frac{2\dot{M}_{meas}RT}{29Pv\omega}$$ (Equation 11)

As implemented in firmware, Equation 11 includes the aforementioned calibration scale factors and offsets used to convert the measured parameters to physical values, as well as the T/C circuit 58 clock frequency to convert pulse repetition frequencies from a number of clock cycles to seconds.

In firmware, the result of the calculation is scaled to an 8-bit number to be sent to a pulse width modulator output of analog display signal conditioning circuit 68, and displayed on the display unit 40. In the present embodiment, the face of the meter, i.e., main display 80, includes a scale that converts the needle position to volumetric efficiency displayed as a percentage.

Because the calculations performed by controller 36 deal with mass flow rates, controller 36 does not need to integrate the measured mass flow over any specific angle of rotation. As a result a new calculation can be performed as frequently as the slowest measured parameter is updated. In a prototype system, the mass air flow sensor and temperature sensor were updated continuously. However, the engine speed and pressure measurements may only be updated at the frequency of the pulses received from the respective sensor, which thus limit the frequency of calculation of volumetric efficiency.

Figure 5A:
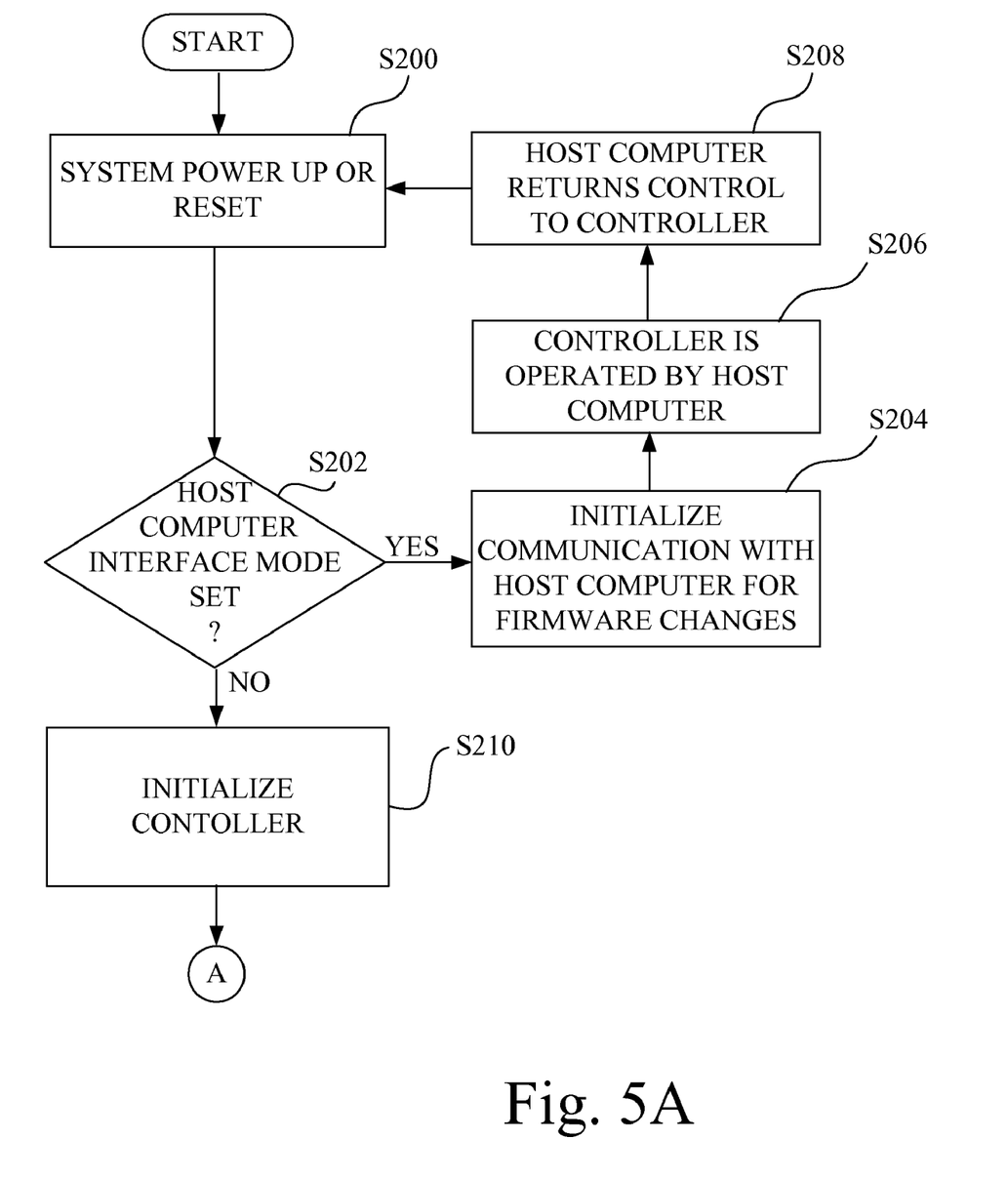
FIGS. 5A and 5B are a flowchart that depicts another embodiment of a method for determining and displaying a volumetric efficiency of an internal combustion engine in accordance with the present invention.
Figure 5B:
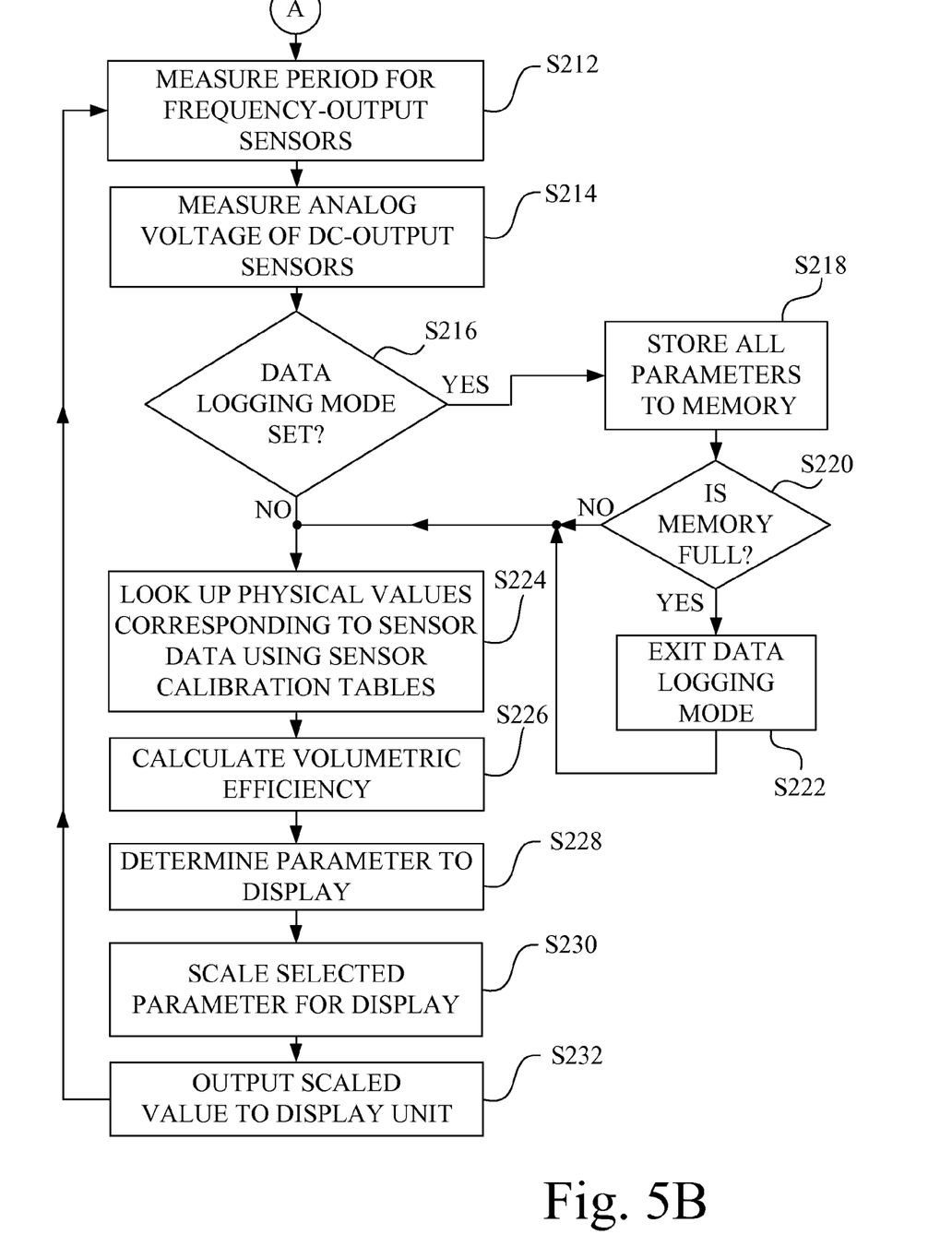

Referring now to FIGS. 5A-5B, another embodiment of a method for determining and displaying a volumetric efficiency of an internal combustion engine in accordance with the present invention is described.

At step S200, system 10 is powered up or reset, e.g., by engaging the ignition switch of automobile 14.

At step S202, it is determined if controller 36 is set to host communication interface mode. If so, the process proceeds to step S204, otherwise process flow proceeds to step S210.

At step S204, communication with host computer 92 is initialized for firmware changes, e.g., to download updated program instructions into NV memory 38.

At step S206, controller 36 is operated by host computer 92 to download updated program instructions into NV memory 38.

At step S208, host computer 92 returns control to controller 36, after which process flow proceeds back to step S200 to reset system 10.

At step S210, controller 36 is initialized. The process assumes from this point forward that engine 12 is presently operating.

At step S212, the period for frequency-output sensors (barometric pressure sensor 24 and engine revolution indicator 26) is measured.

At step S214, the analog output voltage of the dc-output sensors (mass airflow sensor 20 and air temperature sensor 22) is measured.

At step S216, a determination is made as to whether the data logging mode is set. If so, process flow proceeds in parallel to step S218 and to step S224, otherwise, process flow proceeds to step S224.

At step S218, all parameters, e.g., sensor output and volumetric efficiency calculated in the previous cycle, are stored in removable memory 74.

At step S220, a determination is made as to whether removable memory 74 is full. If not process flow proceeds to step S224. Otherwise, process flow proceeds to step S222.

At step S222, data logging mode is automatically exited.

At step S224, physical values corresponding to sensor data for MAF sensor 20 and air temperature sensor 22 are obtained from sensor calibration tables, i.e., the lookup tables stored in NV memory 38, and the physical value for pressure is calculated based on the output of barometric pressure sensor 24.

At step S226, volumetric efficiency is calculated based on the values obtained at step S224. The calculations may be based on Equations 1-11, set forth above.

At step S228, a determination is made as to which parameter has been selected for display on main display 80.

At step S230, the parameter selected for display is scaled for displaying on main display 80.

At step S232, the scaled value of the parameter is displayed on main display 80.

The processes of steps S212 through S232 are repeated as long as system 10 is powered.

By performing the volumetric efficiency calculations based solely on sensor data and calibration data, in accordance with the present invention, the storage of large lookup tables that correlate engine speed, air mass flow rate, air temperature and/or barometric pressure is avoided, thus saving memory space, which may reduce the cost of determining volumetric efficiency. Also, since the determination of volumetric efficiency is based on existing ambient pressure and temperature conditions, the determination may be more accurate than systems that use lookup tables that are based on standard temperature and pressure data. Even if such standardized lookup tables included variable intake pressure and temperature data, such tables may be cost prohibitive due to requiring a large memory size, which is avoided by the present invention. Further, unlike the present invention, the use of such standardized lookup tables may be unable to compensate for engine modifications, e.g., valve lift, duration and timing changes, intake manifold volume changes, stroke and displacement modification, and hence, may not be capable of providing accurate volumetric efficiency data for a modified engine.

Although the embodiments described herein make use of a microprocessor, it will be understood by those skilled in the art that state machines or other processing elements may be employed in place of a microprocessor, without departing from the scope of the present invention.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for determining and displaying a volumetric efficiency of an engine of an automobile, said engine including a plurality of original equipment manufacturer (OEM) sensors and an electronic control unit (ECU) coupled to said plurality of OEM sensors for operating said engine based on reading a sensor output from each sensor of said plurality of OEM sensors, said system comprising:
   an aftermarket display unit configured for installation into said automobile; and
   a controller, said controller including:
      a first memory configured to store calibration data associated with at least some of said plurality of OEM sensors and displacement data associated with said engine;
      a plurality of controller inputs coupled to said plurality of OEM sensors; and
      a controller output coupled to said aftermarket display unit,
   said controller being configured to execute program instructions to:
      read said sensor output;
      determine said volumetric efficiency based on said sensor output, said calibration data and said displacement data; and
      display said volumetric efficiency using said aftermarket display unit.

2. The system of claim 1, said controller further including a microprocessor configured to execute said program instructions.

3. The system of claim 1, said plurality of OEM sensors including an engine revolution indicator, said controller being configured to execute said program instructions to said determine said volumetric efficiency in real time during each revolution of said engine based on said sensor output from said engine revolution indicator.

4. The system of claim 3, said controller being configured to execute said program instructions to said determine said volumetric efficiency in real time a plurality of times during each revolution of said engine.

5. The system of claim 1, further comprising said controller being configured to average said volumetric efficiency and display said average using said aftermarket display unit.

6. The system of claim 1, further comprising a removable memory configured for logging data pertaining to said sensor output.

7. The system of claim 1, further comprising a communication interface configured to interconnect said controller with a host computer associated with an end user of said system.

8. The system of claim 1, wherein said controller and said aftermarket display unit are configured to display a plurality of parameters using said aftermarket display unit, said system further comprising a user interface coupled to said controller, said user interface configured to receive a user input to selectively direct said controller to display at least one of said plurality of parameters using said aftermarket display unit, said plurality of parameters including said volumetric efficiency and said sensor output for at least one of said plurality of said OEM sensors.

9. The system of claim 1, said controller being configured to execute said program instructions for selective operation in at least one of a plurality of operating modes, said system further comprising:
   a user interface configured to receive a user input to select said at least one of said plurality of operating modes,
   wherein said plurality of operating modes includes at least two of: a data logging mode configured to log data pertaining to said sensor output; a host computer interface mode; and a normal operating mode.

10. The system of claim 9, wherein said host computer is associated with an end user of said system, and wherein said controller is configured to receive updates to said program instructions from said host computer while operating in said host computer interface mode.

11. The system of claim 9, wherein said host computer is associated with an end user of said system, and wherein said controller is configured to receive changes to said calibration data and said displacement data from said host computer while operating in said host computer interface mode.

12. The system of claim 1, further comprising a status display coupled to said controller, said status display being configured to indicate at least one of:
   an operating mode that said controller is currently operating in, said controller being configured for selective operation in at least one of a plurality of operating modes; and
   a parameter currently being displayed by said aftermarket display unit,
   said controller and said aftermarket display unit being configured to selectively display at least one said parameter from a plurality of parameters using said aftermarket display unit,
   wherein said plurality of parameters include said volumetric efficiency and said sensor output for at least one of said plurality of said OEM sensors.

13. The system of claim 1, wherein said plurality of OEM sensors includes a mass airflow sensor, an air temperature sensor, a barometric pressure sensor, and an engine revolution indicator.

14. The system of claim 1, wherein said plurality of controller inputs are coupled directly to said plurality of OEM sensors in parallel to said ECU.

15. A system for determining and displaying a volumetric efficiency of a positive displacement device, wherein a plurality of sensors are coupled to said positive displacement device, each sensor of said plurality of sensors being configured to provide a sensor output relating to an operating condition of said positive displacement device, said system comprising:
   a display unit; and
   a controller, said controller including:
      a memory configured to store calibration data associated with at least some of said plurality of sensors and displacement data associated with said positive displacement device;
      a plurality of controller inputs coupled directly to said plurality of sensors; and
      a controller output coupled to said display unit, said controller being configured to execute program instructions to:
      read said sensor output;
      determine said volumetric efficiency based on said sensor output, said calibration data and said displacement data; and
      display said volumetric efficiency using said display unit.

16. The system of claim 15, said plurality of sensors including a device revolution indicator, said controller being configured to execute said program instructions to said determine said volumetric efficiency in real time during each revolution of said device based on said device revolution indicator.

17. The system of claim 15, said controller being configured to execute said program instructions for selective operation in at least one of a plurality of operating modes, said system further comprising:
   a user interface configured to receive a user input to select said at least one of said plurality of operating modes, wherein said plurality of operating modes includes at least two of: a data logging mode configured to log data pertaining to said sensor output; a host computer interface mode; and a normal operating mode.

18. A method for determining and displaying a volumetric efficiency of an internal combustion engine, wherein a plurality of sensors are coupled to said internal combustion engine, each sensor of said plurality of sensors being configured to provide a sensor output relating to an operating condition of said internal combustion engine, comprising:
coupling said plurality of sensors to a controller;
coupling a display unit to said controller; and
executing program instructions with said controller to:
obtain said sensor output from said plurality of sensors;
obtain calibration data associated with at least some of said plurality of sensors;
obtain displacement data associated with said internal combustion engine;
determine said volumetric efficiency based on said sensor output, said calibration data and said displacement data; and
display said volumetric efficiency to a user of said internal combustion engine with said display unit.

19. The method of claim 18, further comprising initializing said controller by configuring said program instructions with a host computer associated with said user.

20. The method of claim 18, further comprising initializing said controller by setting at least one of said calibration data and said displacement data.

21. The method of claim 18, wherein said controller is coupled directly to said plurality of sensors and obtains said sensor output by receiving said sensor output directly from said plurality of sensors.

22. The method of claim 18, wherein said plurality of sensors includes a mass airflow sensor, an air temperature sensor and a barometric pressure sensor, and wherein said volumetric efficiency is determined based on said sensor output from each of said mass airflow sensor, said air temperature sensor, and said barometric pressure sensor.

23. The method of claim 22, wherein said executing said program instructions with said controller to determine said volumetric efficiency includes calculating a measured intake air mass flow rate based on said sensor output from said mass airflow sensor, and based on said calibration data associated with said mass airflow sensor.

24. The method of claim 22, wherein said plurality of sensors includes a device revolution indicator, and wherein said executing said program instructions with said controller to determine said volumetric efficiency includes determining a theoretical intake air mass flow rate based on:
said sensor output from said air temperature sensor, said barometric pressure sensor and said device revolution indicator;
said calibration data associated with said air temperature sensor and said barometric pressure sensor; and
said displacement data.

25. The method of claim 22, wherein said executing said program instructions with said controller to determine said volumetric efficiency includes calculating a ratio of a measured intake air mass flow rate and a theoretical intake air mass flow rate in real time.

* * * * *